(12) United States Patent
Krasowski et al.

(10) Patent No.: US 11,760,025 B2
(45) Date of Patent: Sep. 19, 2023

(54) TRANSLATING CONTENTS OF A PRINT CHAMBER TO A SECONDARY CHAMBER

(71) Applicant: Hewlett-Packard Development Company, L.P., Spring, TX (US)

(72) Inventors: Wojciech Jerzy Krasowski, Sant Cugat del Valles (ES); Arturo Garcia Gomez, Sant Cugat del Valles (ES); Josep Maria Fernandez Sanjuan, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/311,973

(22) PCT Filed: Apr. 29, 2019

(86) PCT No.: PCT/US2019/029721
§ 371 (c)(1),
(2) Date: Jun. 8, 2021

(87) PCT Pub. No.: WO2020/222769
PCT Pub. Date: Nov. 5, 2020

(65) Prior Publication Data
US 2022/0040923 A1 Feb. 10, 2022

(51) Int. Cl.
*B33Y 30/00* (2015.01)
*B29C 64/379* (2017.01)
(Continued)

(52) U.S. Cl.
CPC .......... *B29C 64/379* (2017.08); *B29C 64/245* (2017.08); *B29C 64/255* (2017.08); *B33Y 30/00* (2014.12); *B33Y 40/00* (2014.12)

(58) Field of Classification Search
CPC ..... B29C 64/255; B29C 64/25; B29C 64/259; B29C 64/364; B29C 64/35; B29C 64/357;
(Continued)

(56) References Cited

U.S. PATENT DOCUMENTS 10,787,352 B2 * 9/2020 Huebinger .............. B22F 10/73
2008/0060330 A1 3/2008 Davidson et al.
(Continued)

FOREIGN PATENT DOCUMENTS

WO WO-2017023284 A1 2/2017
WO WO-2017054859 A1 4/2017
(Continued)

OTHER PUBLICATIONS

U.S. Pat. No. 10,787,352-B2 ESpacenet Description with Paragraph Numbers (Year: 2023).*

(Continued)

*Primary Examiner* — Susan D Leong
*Assistant Examiner* — Anna J. Perkins
(74) *Attorney, Agent, or Firm* — Shook, Hardy & Bacon L.L.P.

(57) ABSTRACT

A platform is moved to translate contents of a print chamber to a secondary chamber. Negative pressure is applied to the secondary chamber and print chamber during motion of the platform, to reduce friction between the contents of the print chamber and sidewalls of the print chamber.

8 Claims, 6 Drawing Sheets

(51) Int. Cl.
*B33Y 40/00* (2020.01)
*B29C 64/245* (2017.01)
*B29C 64/255* (2017.01)

(58) Field of Classification Search
CPC ......... B33Y 30/00; B33Y 40/00; B22F 12/38; B22F 12/30
See application file for complete search history.

(56) References Cited

U.S. PATENT DOCUMENTS

| | | |
|---|---|---|
| 2010/0140852 A1 | 6/2010 | Kritchman |
| 2016/0052166 A1 | 2/2016 | Hartmann |
| 2016/0311167 A1 | 10/2016 | Gunther et al. |
| 2018/0001557 A1* | 1/2018 | Buller .................... B33Y 50/02 |
| 2018/0043632 A1 | 2/2018 | Schuller et al. |
| 2018/0141241 A1* | 5/2018 | Staal ..................... B29C 64/124 |
| 2018/0281237 A1 | 10/2018 | Frechman et al. |

FOREIGN PATENT DOCUMENTS

| | | | |
|---|---|---|---|
| WO | WO-2017196383 A1 * | 11/2017 | ......... B29C 37/0003 |
| WO | WO-2018199877 A1 | 11/2018 | |
| WO | WO-2019022759 A1 | 1/2019 | |

OTHER PUBLICATIONS

International Search Report and Written Opinion dated Jan. 16, 2020, PCT Patent Application No. PCT/US 2019/029721, filed Apr. 29, 2019, Federal Institute of Industrial Property, Moscow, Russia, 6 pages.

\* cited by examiner

TRANSLATING CONTENTS OF A PRINT CHAMBER TO A SECONDARY CHAMBER

BACKGROUND

Three-dimensional (3D) printing may produce a 3D object. In particular, a 3D printer may add successive layers of a build material, such as powder, to a build platform. The 3D printer may selectively solidify portions of each layer, to produce the 3D object. The material may be powder, or powder-like material, including metal, plastic, composite material and other powders.

In one example, the build platform incrementally descends into a print chamber during 3D printing, in order for the successive layers to be formed. Once printing of the 3D object has completed, the 3D object and any excess powder that has not been solidified may be removed from the print chamber.

DETAILED DESCRIPTION

Examples of the present disclosure include a system comprising a receiving section to receive a build unit and a secondary chamber. The build unit has a print chamber, in which an object may be formed, and a moveable platform within the print chamber. In some examples, the build unit is a modular unit attachable to a 3D printer for printing, before being removed therefrom and subsequently received in the receiving section. Accordingly, the build unit may comprise contents, for example a 3D object and excess powder that does not form part of the 3D object.

The secondary chamber is to receive of the contents of the print chamber. Accordingly, upon receipt of the contents of the print chamber, the secondary chamber can be detached from the build chamber whilst retaining the contents. The secondary chamber may be disposed above the print chamber. The secondary chamber comprises a port. In one example, the secondary chamber is a cooling chamber. In some examples, the cooling chamber is a natural cooling chamber, which does not comprise a cooling mechanism. In further examples, the secondary chamber may be a storage chamber. In still further examples, the secondary chamber may be a curing chamber. Particularly, in some 3D printing processes, for example a metal 3D printing process, a 3D object is heated once printed to activate a curing agent. Accordingly, the secondary chamber may be removed from the build unit and then heated to cure the 3D object.

Examples of the system further comprise a negative pressure source, connectable to the port, and a control unit to control the build unit and the negative pressure source to activate the negative pressure source during translation of the moveable platform. The application of negative pressure may reduce friction between the contents of the print chamber and sidewalk of the print chamber, thus facilitating the transport of the contents of the print chamber to the secondary chamber.

References herein to negative pressure are references to pressures lower than atmospheric pressure. Negative pressure may also be referred to as reduced pressure, or vacuum pressure.

Figure 1:
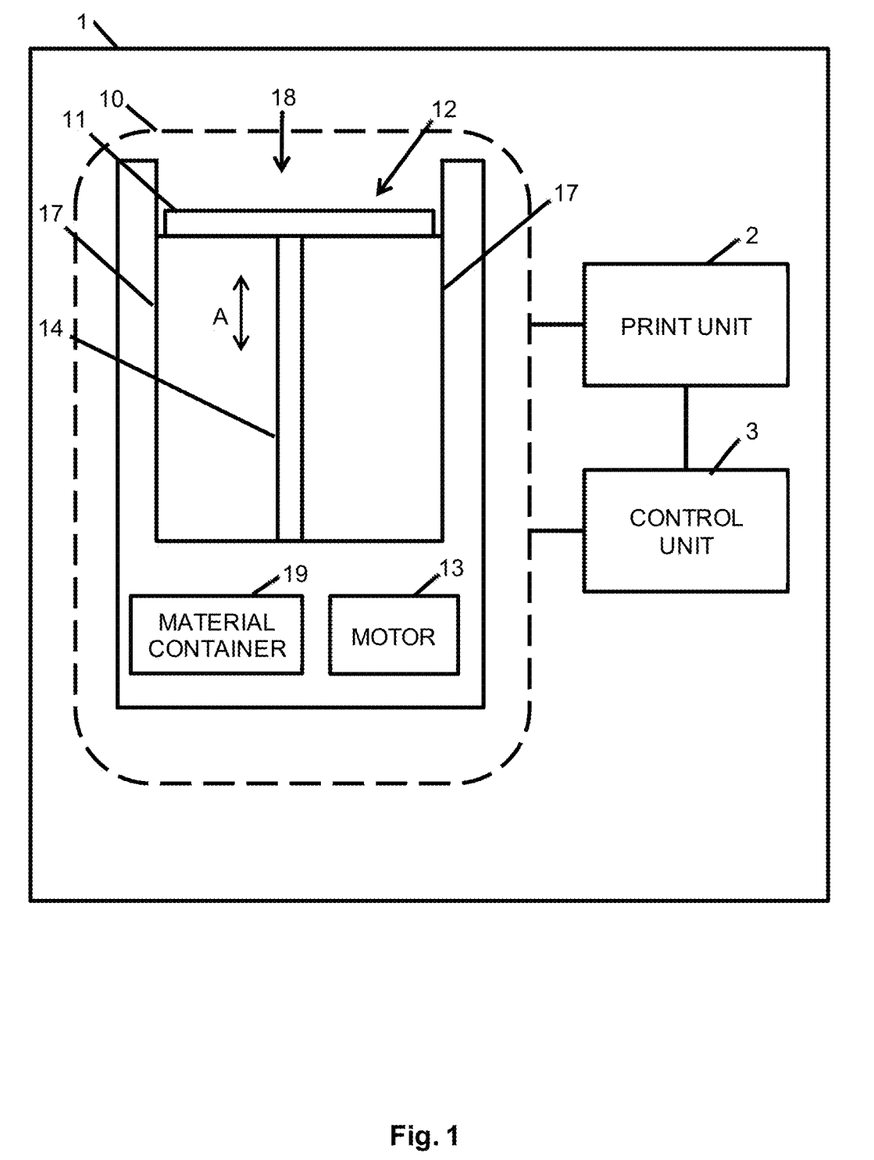
FIG. 1 is a schematic view of a 3D printer and build unit according to one example.

FIG. 1 shows a 3D printer 1. The 3D printer 1 comprises a print unit 2 and a print control unit 3. The 3D printer is also configured to receive a build unit 10. The build unit 10, which is shown in schematic cross-section in FIG. 1, may be a modular unit insertable into the 3D printer 1.

The build unit 10 comprises a print chamber, generally indicated by the reference number 12, in which the formation of a 3D object takes place. In one example, the print chamber 12 is a substantially cuboid volume defined in the interior of the build unit 10, formed by sidewalls 17. The print chamber 12 may have a substantially open top end 18.

The print chamber 12 comprises a movable platform 11, which may be configured to translate in a substantially vertical direction, as indicated by arrow A. The movable platform 11 may support a print bed upon which a 3D object is produced. In some examples, the print bed is detachable from the platform 11. The moveable platform 11 forms a bottom of the print chamber 12, and is sealed around its edges to the sidewalls 17.

Figure 2:
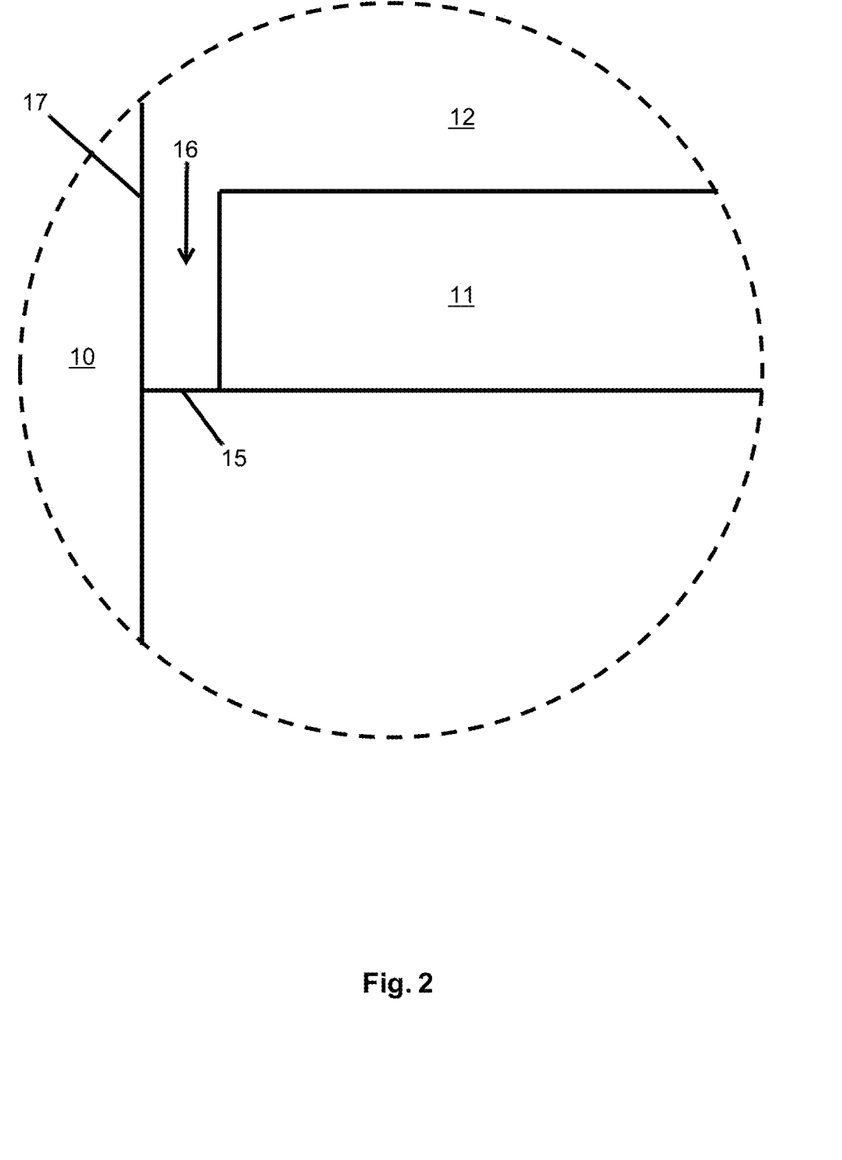
FIG. 2 is an enlarged view of a portion of the build unit according to one example.

For example, as shown in FIG. 2, a seal 15, which may be a resilient member, extends from the platform 11 to the sidewall 17. The seal 15 prevents build material escaping under the platform 11. A clearance between the platform 11 and the sidewall 17 results in a gap 16 being formed between the platform 11 and the sidewall.

The build unit 10 may comprise an actuation mechanism 14 for translating the platform. In one example, the actuation mechanism comprises a drive screw. In further examples, the actuation mechanism 14 may comprise a scissor jack, a piston or any other suitable actuator. In some examples, a motor 13 may provide power to the actuation mechanism 14. In some examples, the build unit 10 comprises a material container 19, configured to retain build material for use in 3D printing.

The print unit 2 comprises any suitable elements to carry out 3D printing with the build unit 10. The print unit 2 may for example comprise a build material supply mechanism to deliver build material to the print chamber 12, for example from the material container 19. The print unit 2 may comprise a print mechanism to form a layer of the 3D object from the build material. The print unit 2 may use one of selective laser sintering, electron beam melting, thermal fusion or other 3D printing and additive manufacturing techniques to generate the layer of the 3D object from the build material.

The print control unit 3, which may comprise a processor and a memory, is to control the print unit 2 in order to generate the 3D object. In addition, the print control unit 3 is to control the build unit 10. In one example, the control unit 3 controls the moveable platform 11, for example by activating the motor 13. The build unit 10 may interface with the 3D printer 1 in order to receive control signals from the control unit 3.

In use, the print control unit 3 controls the print unit 2 to deliver a layer of build material to the print chamber 12 and then form a layer of the 3D object. Once the layer is formed, the print control unit 3 controls the build unit to vertically descend the platform 11 by the depth of a layer. The process is then repeated until all desired layers have been formed. Upon completion of the process, the contents of the print chamber 12 comprises the 3D object and a substantial amount of unsolidified powder. The build unit 10 may then be detached from the printer 1.

Figure 3:
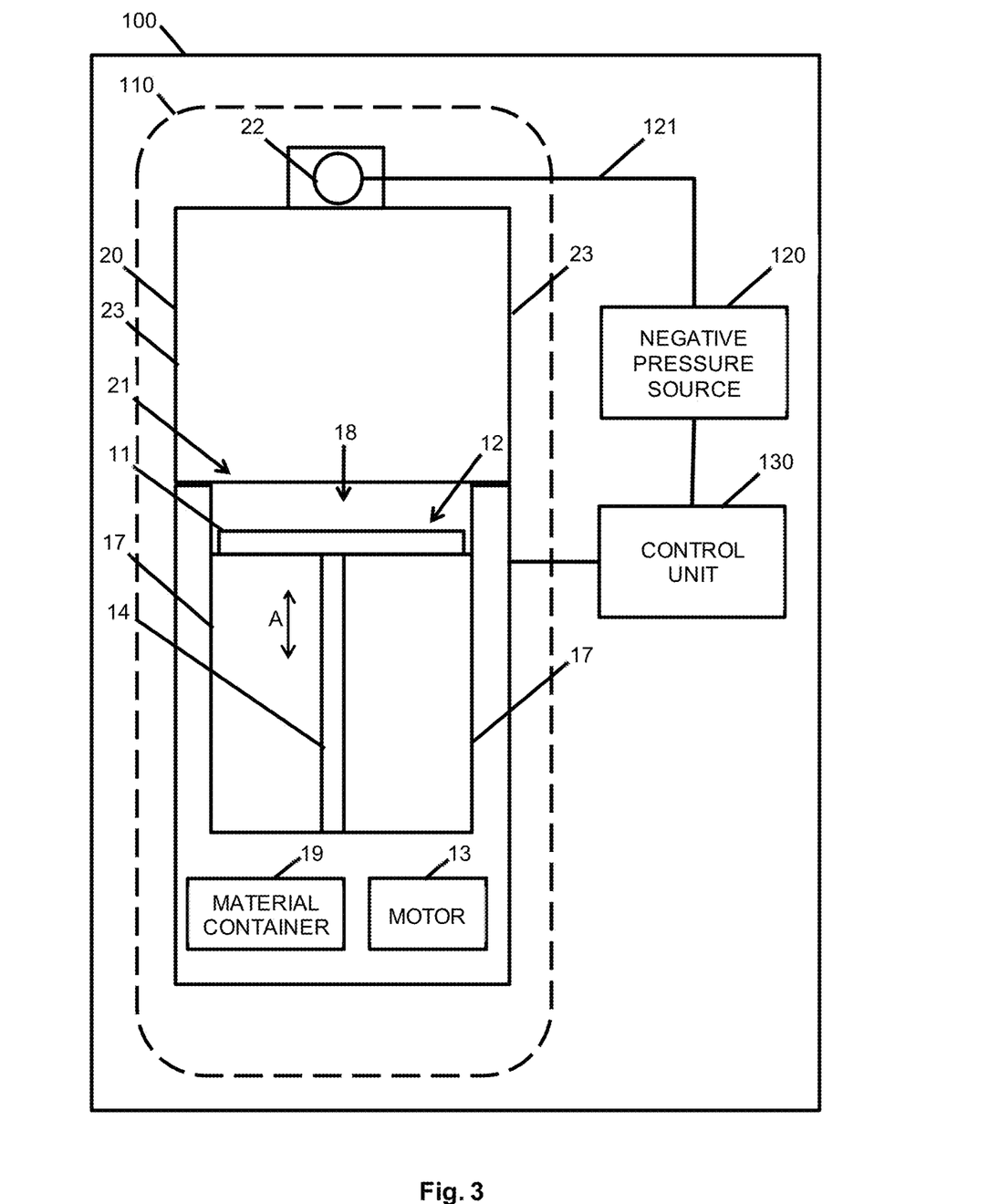
FIG. 3 is a schematic view of a system according to an example of the disclosure.

FIG. 3 shows a system 100 according to an example of the disclosure. The system 100 comprises a receiving section 110, a negative pressure source 120 and a control unit 130. In one example, the system 100 comprises a processing station, at which the contents of the print chamber 12 may be extracted.

The system 100 comprises a receiving section 110. The receiving section 110 is to receive the build unit 10. Furthermore, the receiving section 110 is also to receive a secondary chamber 20. The receiving section 110 may take the form of a suitable recess sized to receive the build unit 10, with secondary chamber 20 attached to the build unit 10. FIG. 3 shows the build unit 10 and secondary chamber 20 in schematic cross-section.

The secondary chamber 20 comprises an enclosure. In one example, the secondary chamber 20 is cuboid in shape. The chamber comprises an open bottom end 21. The chamber comprises sidewalls 23. The bottom end 21 is configured to be placed in communication with the open top end 18 of the build unit 10. For example, the bottom of the secondary chamber 20 may attach to the top of build unit 10. Accordingly, upon ascent of the platform 11 the contents of the print chamber 12 are translated to the secondary chamber 20.

The secondary chamber 20 comprises a port 22. In one example, the port 22 is formed at a top portion of the secondary chamber 20, which may be disposed at an opposite end of the chamber 20 to the open bottom end 21.

In one example, the secondary chamber 20 is detachable from the system 100 after receipt of the contents of the print chamber 12, while retaining the contents of the print chamber. For example, the secondary chamber 20 may be configured to receive a plate (not shown) whilst attached to the build unit 10, which seals the bottom end 21. Accordingly, the contents may be removed from the build unit 10.

In one example, the secondary chamber 20 is a cooling chamber. Therefore, the contents may be cooled separately, allowing the build unit 10 to be reused. In one example, the secondary chamber 20 is a natural cooling chamber. In other words, the secondary chamber 20 does not comprise a cooling mechanism, but instead provides a chamber in which the contents can be left to naturally return to ambient temperature. In further examples, the secondary chamber 20 comprises a cooling mechanism.

In other examples, the secondary chamber 20 is a storage chamber, in which a 3D-printed object may be stored, for example for later processing. In still further examples, the secondary chamber 20 is a curing chamber, for example in which a 3D-printed object may be heated so as to activate a curing agent.

The negative pressure source 120 may for example comprise a pump. The negative pressure source 120 is to generate negative pressure, which may also be referred to herein as a vacuum pressure. The pressure may for example be in the range of from 50 kPa to 0.1 kPa. Suitably, the pressure is in the range of from 45 kPA to 0.5 kPa, suitably 40 kPa to 1 kPa, suitably, 35 kPa to 2 kPa, suitably 30 kPa to 3 kPa, suitably 25 kPa to 4 kPa, suitably 20 kPa to 5 kPa, suitably 18 kPa to 6 kPa, suitable 17 kPa to 7 kPa. In one example, the negative pressure source 120 is configured to selectively generate a desired pressure.

The negative pressure source 120 is configured to be placed in fluid communication with the secondary chamber 20, to deliver the negative pressure to the secondary chamber 20. For example the negative pressure source 120 is connectable to port 22. In one example, the system 100 comprises a negative pressure conduit 121 in fluid communication with the negative pressure source 120. The conduit 121 is attachable to the port 22, for example by a suitable mechanical, air tight connection. In one example, the conduit 121 is a hose.

The control unit 130 is to control the build unit 10 and the negative pressure source 120 to activate the negative pressure source 120 during translation of the moveable platform 11. In one example, the control unit 130 controls the moveable platform 11, for example by activating the motor 13. The build unit 10 may interface with the system 100 in order to receive control signals from the control unit 130.

In one example, the control unit 130 comprises a processor and a memory. However, in a further example, the control unit 130 may be a logic circuit arranged to activate the negative pressure source 120 when the platform 11 is in motion.

Figure 4:
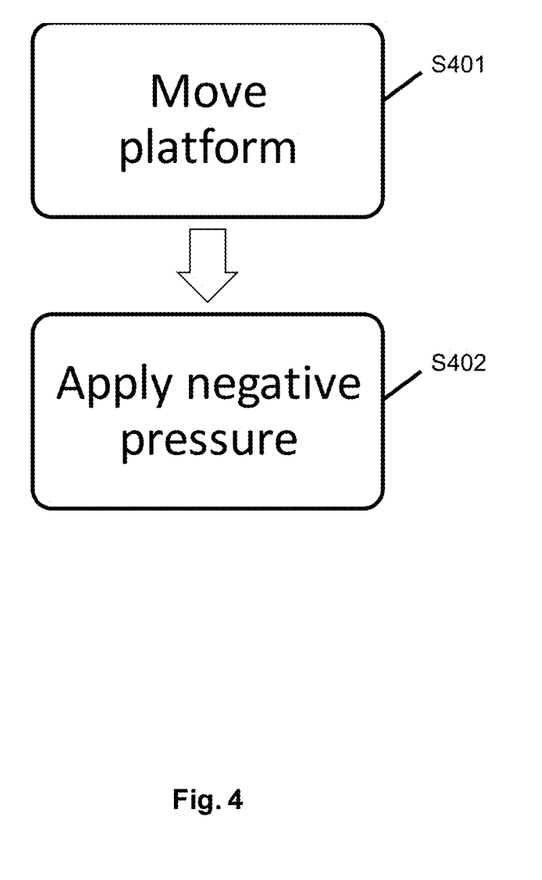
FIG. 4 is a flow chart of an example method.

Use of the system 100 will now be discussed with reference to FIG. 4. Firstly, the build unit 10 is inserted into the receiving section 110, and the secondary chamber 20 is attached to the build unit 10. In other examples, the secondary chamber 20 may be attached before insertion into the receiving section 110. The negative pressure conduit 121 is then attached to the port 22 of the secondary chamber 20.

Subsequently, in 3401, the control unit 130 controls the moveable platform 11 to translate the contents of the print chamber 12 towards the secondary chamber 20. Accordingly, the moveable platform 11 translates upwards. As discussed above, the contents of the print chamber 12 typically comprises a substantial amount of unsolidified powder. Accordingly, this unsolidified powder exerts a frictional force on the sidewalls 17 of the print chamber 12 during motion of the platform 11. Furthermore, when the unsolidified powder reaches the secondary chamber 20, it exerts a similar frictional force on the sidewalls 23 of the secondary chamber 20. The frictional forces resist the force applied by the actuation mechanism 14 and motor 13 to move the platform 11. For example, returning to FIG. 2, it may be that the gap 16 retains unused powder, thereby causing friction between platform 11 and sidewalls 17, 23. Although the gap 16 may be small, the small particle size of the powder permits it to enter the gap.

In S402, the control unit 130 controls the negative pressure source 120, so as to apply negative pressure via port 22. This negative pressure is thereby transmitted to the secondary chamber 20 and print chamber 12. The negative pressure causes powder in contact with the sidewalls 17, 23 to move, thereby reducing the friction. The level of negative pressure applied may be selected so as to cause motion of the unsolidified powder, whilst not drawing it out of the chamber via the port 22.

In one example, the level of negative pressure applied may be selected based on the build material used. For example, the particle size and material of the powder may influence its characteristics in response to the application of negative pressure. For example, a higher level of negative pressure may be applied in order to cause motion of a build material with heavier particles. In some examples, the control unit 130 is configured to select the level of negative pressure applied based on the build material used. The control unit 130 may determine the build material used, for example using stored print job parameters that specify the build material used, and automatically select an appropriate level of negative pressure.

In some examples, S401 and S402 are begun simultaneously. In other words, the application of negative pressure by the negative pressure source 120 and motion of the platform 11 begin at the same time. In other examples, the negative pressure source 120 may be activated before the platform 11 begins to move. In still further examples, the platform 11 may begin to move before the negative pressure is applied.

Similarly, in some examples, S401 and S402 are completed simultaneously. In other words, the application of negative pressure by the negative pressure source 120 and motion of the platform 11 end at the same time. In other examples, the negative pressure source 120 may be deactivated before the platform 11 ceases to move. In still further examples, the platform 11 may cease to move before the negative pressure source 120 is deactivated.

Subsequently, when the contents of the print chamber 12 reach the secondary chamber 20, the negative pressure source 120 is deactivated. The conduit 121 is then detached from the port 22. The secondary chamber 20 is then removed, while retaining the contents of the print chamber. Accordingly, the contents can be left to naturally cool.

Figure 5A:
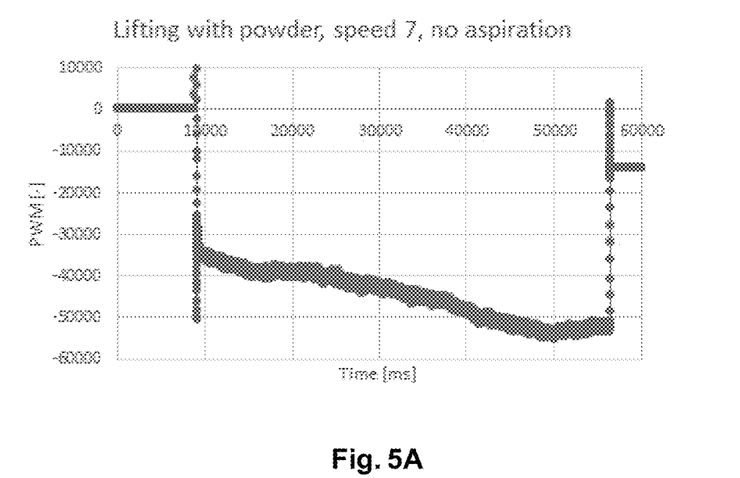
FIGS. 5A and 5B are graphs showing power outputs of a motor for lifting a moveable platform of an example build unit.
Figure 5B:
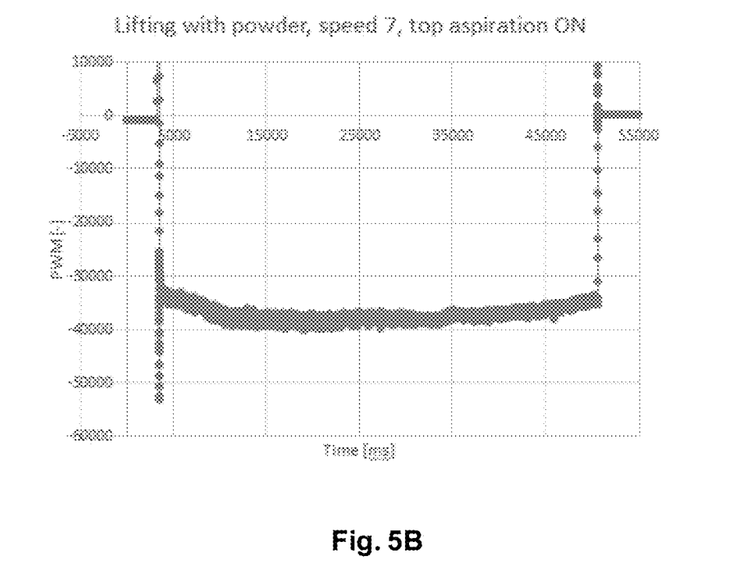

FIGS. 5A and 5B show power outputs of a motor 13 during motion of a platform 11 of an example build unit 10. In both FIGS. 5A and 5B, the platform 11 is being lifted at a substantially constant speed.

In FIG. 5A, the negative pressure source 120 is not activated during motion of the platform 11. Accordingly, the friction between the powder and the sidewalls 17,23 resists the force applied by the motor 13. The power output of the motor 13 increases over time, in order to keep the platform 11 in motion at the constant speed.

In FIG. 5B, the negative pressure source 120 is activated during motion of the platform 11. Accordingly, the unused powder in the chambers 12, 20 is caused to move, and so the friction between the powder and the sidewalls 17, 23 is reduced. It can be seen that the power output of the motor 13 remains substantially constant during motion of the platform 11, and less power is required than in FIG. 5A.

In further examples, the level of negative pressure applied may be varied during motion of the platform 11. In other words, the level of negative pressure may be changed based on the position of the platform 11 along its translation towards the secondary chamber.

Figure 6A:
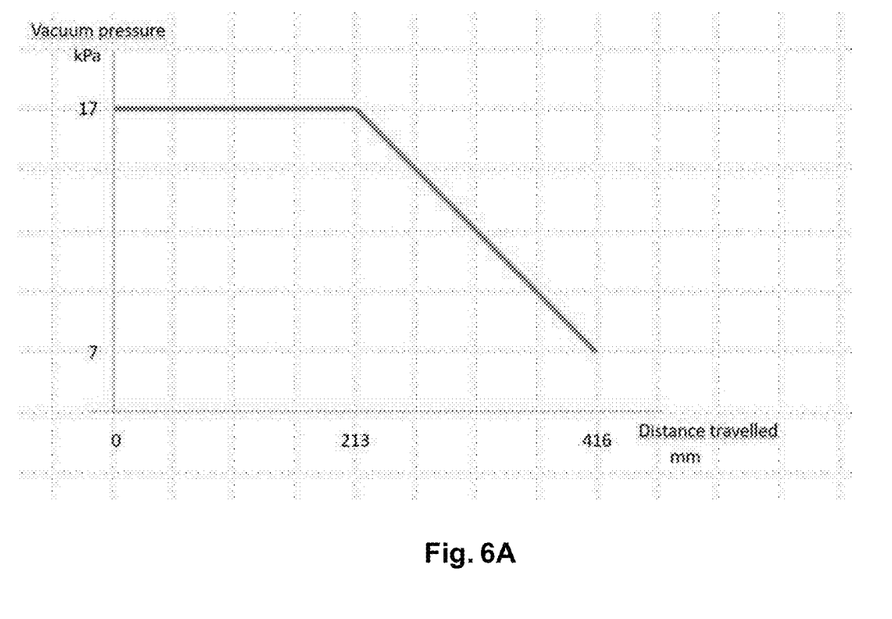
FIGS. 6A and 6B are graphs showing vacuum pressure applied during motion of a moveable platform of an example build unit.
Figure 6B:
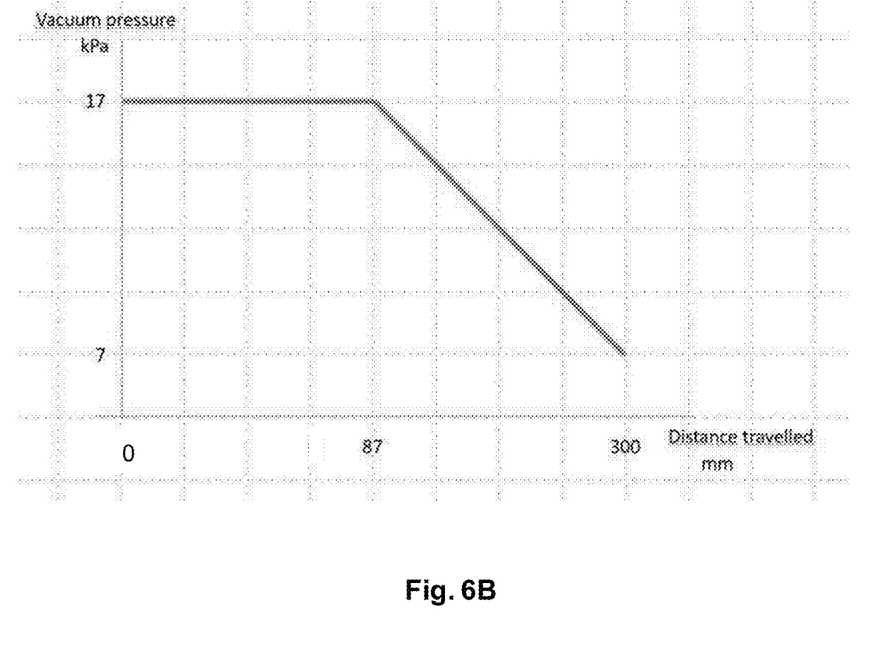

FIGS. 6A and 6B are graphs showing variation of negative pressure applied during motion of the moveable platform 11 of the build unit 10. In the example of FIG. 6A, a first pressure is applied during a first period of motion of the platform 11. The first period may be until the platform 11 is approximately half way through its travel.

Subsequently, during a second period of motion of the platform 11, the negative pressure decreases from the first pressure toward a second pressure. The second period may be until the end of the travel of the platform 11. In one example, the negative pressure decreases linearly during the second period. In further examples, the negative pressure may decrease in a series of steps, or according to non-linear relationship with the position of the platform. In one example, the first pressure is 17 kPa. In one example, the second pressure is 7 kPa.

Accordingly, the amount of suction is decreased as the platform 11 moves closer to the port 22. This in turn reduces the likelihood that the unused powder is drawn out of the secondary chamber 20 via the port 22.

In one example, the control unit 130 is to vary the level of negative pressure applied based on the volume of the contents of the print chamber 12. FIG. 6B illustrates an example in which the print job has a reduced volume compared to FIG. 6A. Accordingly, during printing, the platform 11 will not descend fully. The control unit 130 may determine that the volume of the contents of the print chamber 12 are reduced, for example based on stored print job parameters that specify the volume of the print job or number of layers of the print job. In a further example, the control unit 130 may determine the initial position of the platform 11, for example based on the output of an encoder, and thus determine that the platform 11 is not fully descended.

The length of the initial period may be reduced as shown in FIG. 6B, when the volume is reduced. This may reduce the likelihood that the unused powder is drawn out of the secondary chamber 20 via the port 22.

The invention claimed is:

1. A system comprising:
a receiving section to receive a build unit and a secondary chamber, the build unit having a print chamber in which an object may be formed and a moveable platform within the print chamber to translate contents of the print chamber upward to the secondary chamber after the object is formed, the secondary chamber being disposed above the print chamber to receive the object, the secondary chamber having a port;
a negative pressure source connectable to the port; and
a control unit configured to control the build unit and the negative pressure source to activate the negative pressure source during translation of the moveable platform, to reduce friction between the contents of the print chamber and sidewalls of the print chamber.

2. The system of claim 1, wherein the control unit is to vary a level of negative pressure applied by the negative pressure source based on a position of the moveable platform.

3. The system of claim 2, wherein the control unit is to decrease the level of negative pressure applied by the negative pressure source as the moveable platform translates the contents of the print chamber towards the secondary chamber.

4. The system of claim 1, wherein the port is formed at a top portion of the secondary chamber.

5. The system of claim 1, comprising a negative pressure conduit in fluid communication with the negative pressure source, the negative pressure conduit being connectable to the port.

6. The system of claim 1, wherein the control unit is to vary a level of negative pressure applied by the negative pressure source based on a volume of the contents of the print chamber.

7. The system of claim 1, wherein the secondary chamber is detachable from the build chamber, wherein the secondary chamber is to retain the received object after detachment.

8. The system of claim 1, wherein the control unit is to activate the negative pressure source during upwards translation of the movable platform to translate the contents of the print chamber to the secondary chamber.

* * * * *